United States Patent [19]

Washizu

[11] Patent Number: 5,176,412
[45] Date of Patent: Jan. 5, 1993

[54] JOINT FOR COUPLING SMALL-DIAMETER PIPES

[75] Inventor: Katsushi Washizu, Numazu, Japan

[73] Assignee: Usui Kokusai Sangyo Kaisha, Ltd., Japan

[21] Appl. No.: 670,994

[22] Filed: Mar. 18, 1991

[30] Foreign Application Priority Data

Mar. 19, 1990 [JP] Japan .............................. 2-27903[U]

[51] Int. Cl.⁵ .............................................. F16L 39/00
[52] U.S. Cl. ..................................... 285/319; 285/921
[58] Field of Search ........................ 285/319, 906, 921

[56] References Cited

U.S. PATENT DOCUMENTS

| 2,892,991 | 6/1959 | Beebee et al. . |
| 3,169,030 | 2/1965 | Lippincott . |
| 3,453,005 | 7/1969 | Foults . |
| 3,826,523 | 7/1974 | Eschbaugh . |
| 3,933,378 | 1/1976 | Sandford et al. . |
| 4,026,581 | 5/1977 | Pasbrig . |
| 4,035,005 | 7/1977 | DeVincent et al. . |
| 4,074,912 | 2/1978 | Van Bilderbeek et al. . |
| 4,105,226 | 8/1978 | Frey et al. ..................... 285/319 X |
| 4,219,222 | 8/1980 | Brusadin . |
| 4,275,907 | 6/1981 | Hunt . |
| 4,451,069 | 5/1984 | Melone . |
| 4,471,978 | 9/1984 | Kramer ........................... 285/319 X |
| 4,601,497 | 7/1986 | Bartholomew . |
| 4,637,636 | 1/1987 | Guest . |
| 4,637,640 | 1/1987 | Fournier et al. . |
| 4,673,199 | 6/1987 | Renfrew . |
| 4,681,351 | 7/1987 | Bartholomew . |
| 4,730,856 | 3/1988 | Washizu . |
| 4,749,214 | 6/1988 | Hoskins et al. . |
| 4,753,458 | 6/1988 | Case et al. . |
| 4,776,616 | 10/1988 | Umehara et al. . |
| 4,778,203 | 10/1988 | Bartholomew . |
| 4,781,400 | 11/1988 | Cunningham . |
| 4,793,637 | 12/1988 | Laipply et al. . |
| 4,895,396 | 1/1990 | Washizu . |
| 4,913,467 | 4/1990 | Washizu . |
| 4,915,420 | 4/1990 | Washizu . |
| 4,944,537 | 7/1990 | Usui et al. . |
| 4,946,205 | 8/1990 | Washizu . |
| 4,948,180 | 8/1990 | Usui et al. . |
| 4,964,658 | 10/1990 | Usui et al. . |
| 4,991,882 | 2/1991 | Gahwilen .................... 285/314 X |
| 4,997,216 | 3/1991 | Washizu . |

FOREIGN PATENT DOCUMENTS 593413 5/1959 Italy .
855603 12/1960 United Kingdom .

Primary Examiner—Dave W. Arola
Attorney, Agent, or Firm—Anthony J. Casella; Gerald E. Hespos

[57] ABSTRACT

A joint for coupling small-diameter pipes, comprises a body including a cylindrical joint wall having a bore, and a cylindrical wall defining a stepped enlarged chamber in communication with the bore and receiving seals and a bushing behind the seals, the cylindrical wall having a rear end extending outwardly to provide a flange, and the bushing having an open end, a collar having a rear end extending inwardly to provide a locking wall and a front end extending inwardly to provide a engagement wall engaged with the flange, and a plurality of resilient retainer each having one end engaged with the open end of the bushing and the other end bent to a V-shape to provide a pawl. When coupling is effected, a bent portion of the retainer is brought into engagement with the locking wall, and the pawl is brought into engagement with an annular projection wall formed on one end of a pipe inserted into the enlarged chamber.

3 Claims, 1 Drawing Sheet

JOINT FOR COUPLING SMALL-DIAMETER PIPES

BACKGROUND OF THE INVENTION

1. Field of the Invention

The present invention relates to an improvement in a joint designed to couple pipes made of metal or tube made of resin (hereinafter simply referred to as a pipe) which is relatively small in diameter, typically, less than 20 m/m and is adapted to supply oil or gas, for example, to an automotive vehicle or other various machines and instruments.

2. Description of the Related Art

A conventional joint of this type is shown in FIG. 3 and has a body 11. The body 11 includes a cylindrical wall 11' defining an enlarged chamber 12 in communication with a bore, and another cylindrical wall integral with the cylindrical wall 11' and having a diameter greater than that of the cylindrical wall 11'. The latter cylindrical wall has a rear end bent inwardly to provide a locking wall 11". The reference numeral 13 denotes seals disposed within the enlarged chamber 12. 14 is a bushing inserted behind the seals. 15 is a retainer engaged with the locking wall 11". The retainer 15 has a pawl 15' which may be brought into engagement with a projection wall Po' of a pipe Po when coupling is effected.

However, in such a conventional joint, the body 11 needs be cut to integrally form the cylindrical wall 11'. This results in a substantial decrease in the productibity of the joint. Cumbersome cutting operation increases the production cost of the joint. It is also difficult to incorporate the seals 13 and the bushing 14 into the enlarged chamber which is smaller in diameter.

SUMMARY OF THE INVENTION

In view of the foregoing, it is an object of the present invention to provide a joint for coupling small-diameter pipes, which is much easier to manufacture, which is high in productibity and can thus be manufactured at low cost, and which enables easy assembly of seals and bushing into the enlarged chamber.

In order to achieve these objects, there is provided a joint which comprises a body including a cylindrical joint wall having a communication bore, and a cylindrical wall defining a stepped enlarged chamber in communication with the communication bore and receiving seals and a bushing behind the seals, the cylindrical wall having a rear end extending outwardly to provide a flange, and the bushing having an open end, a collar having a rear end extending inwardly to provide a locking wall and a front end extending inwardly to provide an engagement wall engaged with the flange, and a plurality of resilient retainer each having one end engaged with the open end of the bushing and the other end bent to a V-shape to provide a pawl, wherein upon coupling, a bent portion of the retainer is brought into engagement with the locking wall, and the pawl is brought into engagement with an annular projection wall formed on one end of a pipe inserted into the enlarged chamber. The collar has a rear end bent in an overlapping fashion. The pawl has a front end extending outwardly to provide an upright wall.

With this arrangement, the retainer is disposed between the locking wall of the collar and the bushing before the pipe is inserted into the enlarged chamber, or the retainer is assembled on the pipe, and the collar is then moved rearwardly to bring the retainer into engagement with the flange. This allows the bent portion of the retainer to be resiliently engaged with the locking wall of the collar. Now that the collar and the body are separate members, the collar may in particular be in the form of a pipe. This facilitates the manufacture of the body of the joint, improves the productibity of the joint, and reduces its production cost. In addition, the seals and the bushing may readily be assembled into the enlarged chamber.

BRIEF DESCRIPTION OF THE DRAWINGS

For a better understanding of the present invention, reference may be had to the following description of preferred embodiments when taken in conjunction with the accompanying drawings, in which.

DESCRIPTION OF THE PREFERRED EMBODIMENTS

Figure 1:
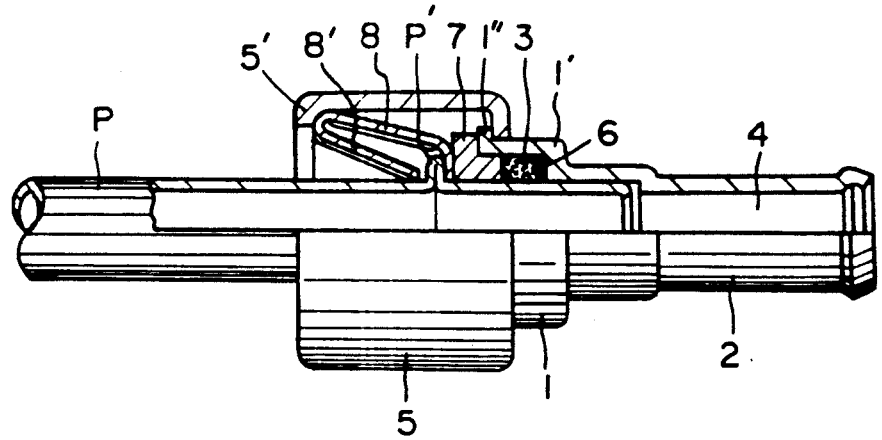
FIG. 1 is a longitudinal sectional view, partly broken away, of a joint according to one embodiment of the present invention, showing the manner in which two small-diameter pipes are connected by the joint.
Figure 2:
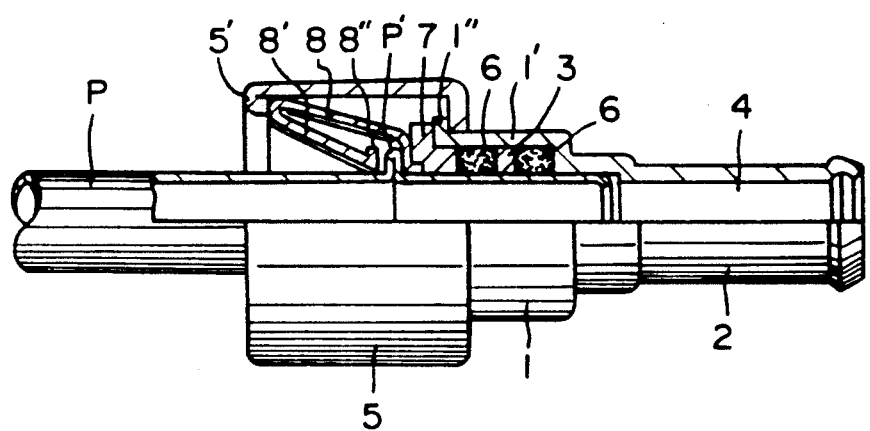
FIG. 2 is a view similar to FIG. 1, but showing another embodiment of the present invention.
Figure 3:
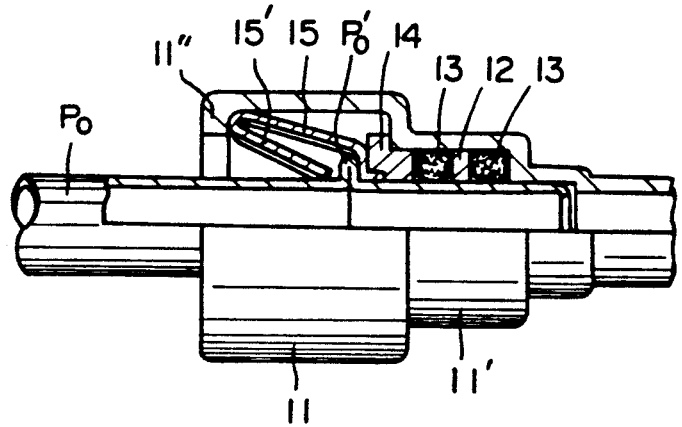
FIG. 3 is a longitudinal view, partly broken away, of a conventional joint, showing the manner in which two pipes are connected by the prior art joint.

With reference to FIGS. 1 and 2, the reference numeral 1 denotes a joint body made of metal or resin. The body 1 includes a cylindrical joint wall 2 at its leading end. The cylindrical joint wall 2 has a bore 4 to receive a metal tube or rubber hose (not shown). A stepped, enlarged chamber 3 is defined by a cylindrical wall 1' and extends continuously from the bore 4. A flange 1" extends radially outwardly from the rear end of the cylindrical wall 1'. Seals 6 are disposed within the enlarged chamber 3. A bushing 7 is also disposed behind the seals 6 and has an open end. The reference numeral 5 denotes a separate collar in the form of a pipe. The collar 5 has a rear end which extends radially and inwardly to form a locking wall 5'. The front end of the collar 5 is in engagement with the flange 1" of the cylindrical wall 1'. A plurality of resilient retainers 8 are disposed within the collar 5 and bent to a V-shape. Each retainer 8 has one end engaged with the open end of the bushing 7 and the other end or pawl 8' engaged with a pipe P. The retainer 8 has a bent portion in engagement with the locking wall 5'. The pipe P is received in the enlarged chamber 3 and has an annular projection wall P' with which the pawl B' is engaged.

It will be understood that the rear end of the collar 5 may be bent in an overlapping fashion as shown in FIG. 2. In addition, the front end of the pawl 8' may extend outwardly to form an upright wall 8" (also, see FIG. 2).

With the joint of the present invention thus far described, the cylindrical wall 1' defining the enlarged chamber 3 is engaged with the discrete collar 5. Thus, a pipe may be used to make the collar 5. This facilitates the manufacture of the body 1 of the joint, improves the productibity of the joint, and reduces its production cost. In addition, the seals and the bushing may readily be assembled into the enlarged chamber 3. The present joint is thus extremely useful.

While preferred embodiments of the present invention have been described in detail, it will be apparent that various changes and modifications may be made therein without departing from the spirit or scope of the invention.

What is claimed is:

1. A joint for coupling a small-diameter pipe, said pipe having an end and an annular projection wall spaced from the end, said joint comprising:

a body including opposed front and rear ends, a cylindrical joint wall extending rearwardly from the front end and having a communication bore extending therethrough, and a cylindrical wall extending forwardly from the rear end and defining a stepped enlarged chamber in communication with said communication bore, said cylindrical wall having a flange extending outwardly at the rear end of the body;

at least one annular seal disposed in the enlarged chamber for sealing engagement around portions of the pipe between the end of the pipe and the annular projection thereof;

an annular bushing having opposed front and rear ends disposed at least partly in the enlarged chamber such that the front end of the bushing engages the seal, the bushing being dimensioned to engage around the portion of the pipe between the end of the pipe and the annular projection thereof;

a collar having a rear end extending inwardly to provide a locking wall spaced rearwardly from the rear end of the body and a front end extending inwardly to provide an engagement wall engaged around the cylindrical wall of the body and adjacent the flange thereof; and a plurality of resilient retainers each having a front end engaged with the rear end of the bushing, a rear end bent to a V-shape and engaged with the inwardly extending locking wall of the collar, such that the collar is securely positioned by the flange of the body and the V-shaped rear ends of the retainers, and a pawl projecting forwardly and inwardly from the V-shaped rear end of each retainer, wherein each said pawl is brought into engagement with the annular projection wall when the end of the pipe inserted into the enlarged chamber.

2. The joint of claim 1, wherein said collar has a rear end bent in an overlapping fashion.

3. The joint of claim 1, wherein said pawl has a front end extending outwardly to provide an upright wall.

* * * * *